US012565241B2

(12) United States Patent
Iwaki

(10) Patent No.: US 12,565,241 B2
(45) Date of Patent: Mar. 3, 2026

(54) CONTROLLER

(71) Applicant: ISUZU MOTORS LIMITED,
Yokohama (JP)

(72) Inventor: Yuuki Iwaki, Fujisawa (JP)

(73) Assignee: ISUZU MOTORS LIMITED,
Yokohama (JP)

( * ) Notice: Subject to any disclaimer, the term of this
patent is extended or adjusted under 35
U.S.C. 154(b) by 100 days.

(21) Appl. No.: 18/403,804

(22) Filed: Jan. 4, 2024

(65) Prior Publication Data

US 2024/0239381 A1      Jul. 18, 2024

(30) Foreign Application Priority Data

Jan. 12, 2023      (JP) ................................. 2023-003134

(51) Int. Cl.
*B60W 60/00*          (2020.01)
*B60W 10/20*          (2006.01)
*B60W 30/09*          (2012.01)
*B62D 6/02*          (2006.01)
*B62D 15/02*          (2006.01)

(52) U.S. Cl.
CPC ........ *B60W 60/0053* (2020.02); *B60W 10/20*
(2013.01); *B60W 30/09* (2013.01); *B60W*
*60/0016* (2020.02); *B62D 6/02* (2013.01);
*B62D 15/02* (2013.01); *B60W 2520/10*
(2013.01)

(58) Field of Classification Search
CPC .. B60W 60/0053; B60W 10/20; B60W 30/09;
B60W 60/0016; B60W 2520/10; B60W 2540/103; B60W 60/0055; B60W
2540/12; B60W 2540/18; B60W 2554/00;
B60W 60/005; B62D 6/02; B62D 15/02;
B62D 15/0265
See application file for complete search history.

(56) References Cited

U.S. PATENT DOCUMENTS

| | | | |
|---|---|---|---|
| 2014/0257661 A1* | 9/2014 | Schulman | ............. B60W 50/08 |
| | | | 701/1 |
| 2016/0209841 A1* | 7/2016 | Yamaoka | ............. B60W 30/00 |
| 2016/0280236 A1 | 9/2016 | Otsuka | |

(Continued)

FOREIGN PATENT DOCUMENTS

| | | |
|---|---|---|
| JP | 2016-137819 A | 8/2016 |
| JP | 2016-175613 A | 10/2016 |

(Continued)

*Primary Examiner* — Khoi H Tran
*Assistant Examiner* — Tristan J Greiner
(74) *Attorney, Agent, or Firm* — Shih IP Law Group,
PLLC

(57)          ABSTRACT

A controller that switches between (i) autonomous driving
control for causing a vehicle to travel by automatically
controlling the steering and speed of the vehicle and (ii)
manual driving control in which the steering and speed are
controlled by a driver's operation, the controller includes: a
determination part that determines whether a speed control
operation for controlling the speed has been performed by
the driver while an obstacle preventing the vehicle from
traveling is being avoided under the autonomous driving
control; and a control switching part that switches the
automatic control of the speed included in the autonomous
driving control to the manual control and continues the
automatic control of the steering when it is determined that
the speed control operation has been performed.

7 Claims, 4 Drawing Sheets

(56)     References Cited

U.S. PATENT DOCUMENTS

| 2018/0088572 | A1  | 3/2018  | Uchida et al. |
| 2018/0194349 | A1* | 7/2018  | McGill, Jr. ....... B60W 60/0013 |
| 2018/0299891 | A1* | 10/2018 | Ichikawa .......... B60W 60/0053 |
| 2020/0262475 | A1* | 8/2020  | Stahl ..................... B62D 6/001 |
| 2020/0361494 | A1* | 11/2020 | Zheng ...................... B62D 6/10 |
| 2021/0024097 | A1* | 1/2021  | Jardine ................ B60W 40/08 |
| 2021/0094575 | A1* | 4/2021  | Sato ..................... B60W 30/16 |

FOREIGN PATENT DOCUMENTS

| JP | 2018-088060 A | 6/2018  |
| JP | 2021-095133 A | 6/2021  |
| JP | 2021-160633 A | 10/2021 |
| JP | 2022-044236 A | 3/2022  |

* cited by examiner

CONTROLLER

CROSS-REFERENCE TO RELATED APPLICATIONS

The present application claims priority to Japanese Patent Applications number 2023-3134, filed on Jan. 12, 2023, contents of which are incorporated herein by reference in their entirety.

BACKGROUND OF THE INVENTION

The present disclosure relates to a controller that switches between automatic control and manual control of a vehicle. An autonomous driving apparatus that performs autonomous driving by controlling the steering and speed of a vehicle has been known. Japanese Unexamined Patent Application Publication No. 2016-175613 discloses a technique for switching autonomous driving to manual driving if an operation amount of an acceleration operation or a braking operation performed by a driver of a vehicle during autonomous driving of the vehicle is equal to or greater than a threshold value.

However, when a driver operates either the accelerator or brakes in a state where obstacle avoidance is performed under automatic control, a steering operation may be delayed if the driver's hand is not on a steering wheel. When automatic control of the steering is switched to manual control in such a situation where the steering operation by the driver would be delayed, the steering of the vehicle is uncontrolled, and therefore obstacles cannot be avoided.

BRIEF SUMMARY OF THE INVENTION

The present disclosure focuses on this point, and its object is to prevent the inability to avoid obstacles.

An aspect of the present disclosure provides a controller that can execute autonomous driving control for causing a vehicle to travel by automatically controlling steering and speed of the vehicle, the controller including: a determination part that determines whether a speed control operation for controlling the speed has been performed by a driver while an obstacle preventing the vehicle from traveling is being avoided under the autonomous driving control; and a control switching part that switches the automatic control of the speed included in the autonomous driving control to the manual control, and continues the automatic control of the steering when it is determined that the speed control operation has been performed.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

Configuration of a Controller 1

Figure 1:
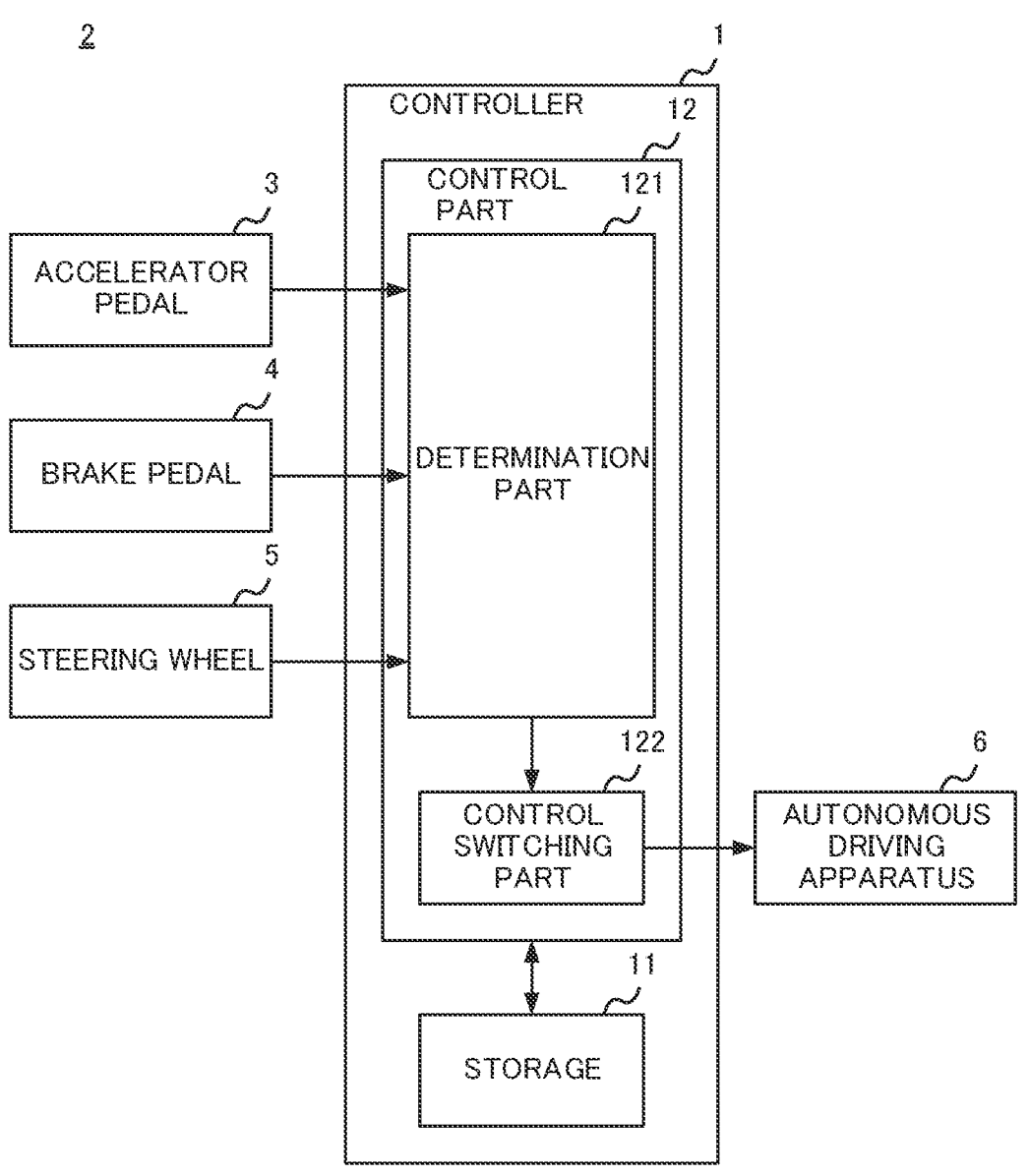
FIG. 1 illustrates a configuration of a controller.

FIG. 1 illustrates a configuration of a controller 1. The controller 1 is mounted on a vehicle 2, which is an autonomous vehicle. The vehicle 2 includes an accelerator pedal 3, a brake pedal 4, a steering wheel 5, and an autonomous driving apparatus 6.

The accelerator pedal 3 and the brake pedal 4 are a speed controller with which the driver of the vehicle 2 controls a speed of the vehicle 2. The driver can accelerate the vehicle 2 by stepping on the accelerator pedal 3, and can decelerate the vehicle 2 by stepping on the brake pedal 4. The driver can change a steering angle of the vehicle 2 by rotating the steering wheel 5.

By automatically controlling the steering and speed of the vehicle 2, the autonomous driving apparatus 6 executes autonomous driving control for causing the vehicle 2 to travel. For example, the autonomous driving apparatus 6 causes the vehicle 2 to travel on its way to a target point on the basis of (i) a detection value of sensors (not shown) such as an image pick-up device and a LIDAR, which detect surrounding conditions of the vehicle 2, and (ii) an output value of a sensor that detects a state of the vehicle 2. Specifically, the autonomous driving apparatus 6 determines a target steering angle for the vehicle 2 such that the vehicle 2 will head toward the target point and causes the steering wheel 5 to rotate so that the steering angle of the vehicle 2 is the target steering angle. The autonomous driving apparatus 6 determines a target speed for the vehicle 2 at the time of heading toward the target point, and controls the accelerator pedal 3 or the brake pedal 4 of the vehicle 2 so that the speed of the vehicle 2 is the target speed. Specifically, the autonomous driving apparatus 6 increases or decreases a depression amount of the accelerator pedal 3 to bring the speed of the vehicle 2 to the target speed. Further, the autonomous driving apparatus 6 decelerates the vehicle 2 by causing the brake of the vehicle 2 to generate braking force by increasing a depression amount of the brake pedal 4. Further, when an obstacle preventing traveling of the vehicle 2 exists ahead in the traveling direction of the vehicle 2, the autonomous driving apparatus 6 avoids the obstacle by causing the vehicle 2 to travel such that the vehicle 2 and the obstacle do not collide with each other. The obstacle is another vehicle, a person, or an object on a road, for example. The autonomous driving apparatus 6 avoids collision between the vehicle 2 and the obstacle by causing the vehicle 2 to pass by the obstacle on one side or stopping the vehicle 2 in front of the obstacle.

The controller 1 switches between (i) the autonomous driving control and (ii) manual driving control in which the steering and speed are controlled by the driver's operation. The manual driving control is manual speed control in which the speed is controlled by the driver's operation of stepping on the accelerator pedal 3 or the brake pedal 4, and is manual steering control in which the steering angle is controlled by the driver's operation of rotating the steering wheel 5.

The controller 1 includes a storage 11 and a control part 12. The storage 11 includes storage media such as a read only memory (ROM), a random access memory (RAM), a hard disk, and the like. The storage 11 stores a program executed by the control part 12.

The control part 12 is a calculation resource including a processor such as a central processing unit (CPU). By executing the program stored in the storage 11, the control part 12 functions as the determination part 121 and the control switching part 122.

The determination part 121 determines whether a speed control operation by the driver is performed while the vehicle 2 is avoiding obstacles under the autonomous driving control. For example, the determination part 121 determines that the speed control operation is performed when at least one of the accelerator pedal 3 or the brake pedal 4 is operated. Specifically, the determination part 121 determines that the speed control operation is performed if at least one of a depression amount of the accelerator pedal 3 or a depression amount of the brake pedal 4 of the vehicle 2 is equal to or greater than a determination threshold value, which is determined according to a target speed that is equivalent to a control amount of a speed under the autonomous driving control. More specifically, the determination part 121 determines that the speed control operation is performed if a depression amount of the accelerator pedal 3 by the driver is equal to or greater than a determination threshold value that corresponds to a depression amount needed to bring the speed of the vehicle 2 to the target speed. Further, the determination part 121 determines that the speed control operation is performed if a depression amount of the brake pedal 4 by the driver is equal to or greater than a determination threshold value that corresponds to a depression amount needed to decelerate the vehicle 2 to the target speed.

Figure 2:
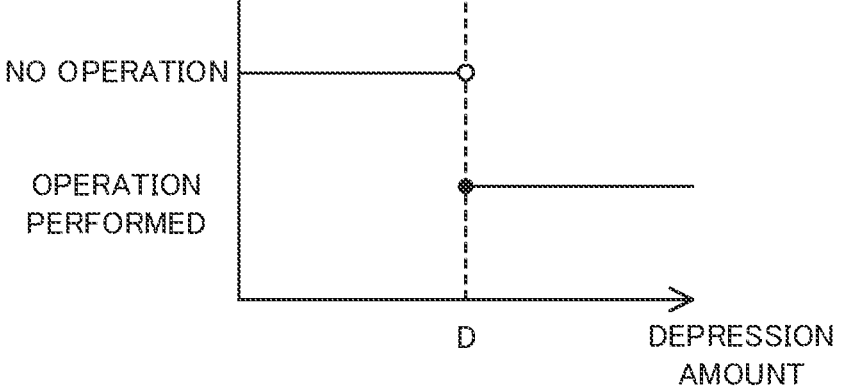
FIG. 2 illustrates a process of determining whether a speed control operation has been performed.

FIG. 2 illustrates a process of determining whether the speed control operation has been performed. The determination part 121 determines that the driver did not perform the speed control operation (no operation) if the depression amount of the brake pedal 4 is less than a determination threshold value D. The determination part 121 determines that the driver performed the speed control operation (operation performed) if the depression amount of the brake pedal 4 is equal to or greater than the determination threshold value D.

When the determination threshold value D is constant, it may be determined that the speed control operation has been performed even though the driver has not performed an operation based on the target speed under the autonomous driving control. Therefore, before executing the process of determining whether the speed control operation has been performed, the determination part 121 sets the determination threshold value D to a value greater than the depression amount required to achieve the target speed under the autonomous driving control. For example, the greater the target speed under the autonomous driving control, the more the determination part 121 increases the value, and sets the increased value as the determination threshold value D. By doing this, the determination part 121 can prevent the driver's operation from being reflected when the obstacle cannot be avoided by the speed control operation performed by the driver. It should be noted that the determination part 121 determines the same for the accelerator pedal 3.

Figure 3:
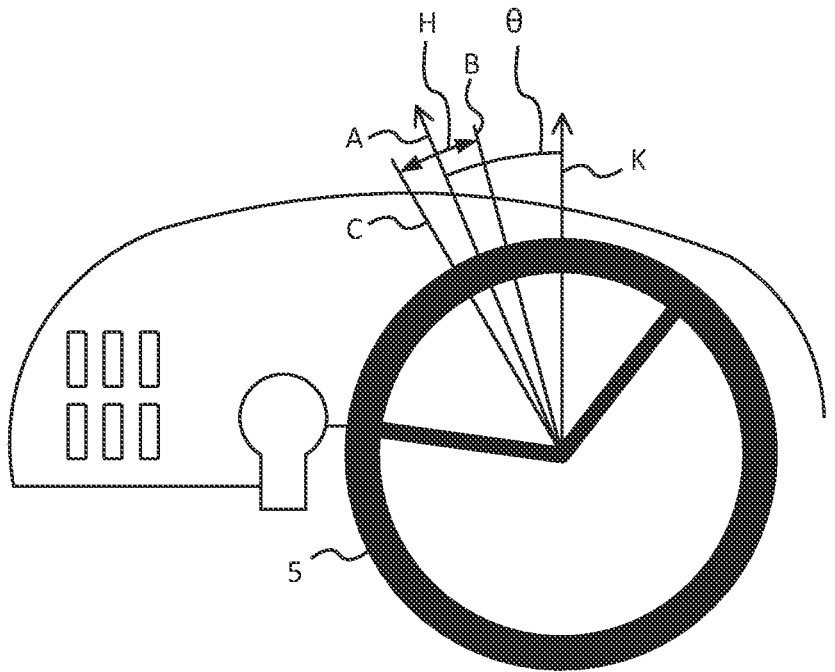
FIG. 3 illustrates a process of determining whether a steering control operation has been performed.

The determination part 121 determines whether a steering control operation by the driver has been performed. FIG. 3 illustrates a process of determining whether a steering control operation has been performed. For example, in a case where the autonomous driving apparatus 6 performs automatic control of the steering without rotating the steering wheel 5, the determination part 121 determines that the steering control operation has been performed if the steering wheel 5 has been rotated from a reference position K during the automatic control of the steering. Specifically, the determination part 121 determines that the steering control operation has been performed if a rotation angle of the steering wheel 5 has become equal to or greater than a reference angle θ corresponding to a control amount of the steering (a target steering angle) under the autonomous driving control. The process of determining that the steering control has been performed by the driver may be performed by a contact detection sensor attached to the steering wheel 5. Specifically, the determination part 121 determines that the steering control operation has been performed when contact with an object is detected by the contact detection sensor. The contact detection sensor is a capacitive sensor, and detects that the object is in contact when the human hand touches the contact detection sensor, for example.

Before executing the process of determining whether the steering control operation has been performed, the determination part 121 sets, as the reference angle θ, an angle by which the steering wheel 5 is rotated to a position A corresponding to the control amount of the steering. In other words, the determination part 121 sets, as the reference angle θ, a rotation angle of the steering wheel 5 required for the steering angle under the autonomous driving control. It should be noted that the rotation angle of the steering wheel 5 is 0 degrees when the steering wheel 5 is at the reference position K, for example.

In a case where the autonomous driving apparatus 6 performs the automatic control of the steering by rotating the steering wheel 5, the determination part 121 determines that the steering control operation has been performed if the rotation angle of the steering wheel 5 is outside of a determination range H, in which the reference angle θ is included. In this case, the determination part 121 sets, as the determination range H, a range that is equal to or less than an upper limit value B obtained by adding a predetermined value to the reference angle θ, and is equal to or greater than a lower limit value C obtained by subtracting the predetermined value from the reference angle θ. The predetermined value may be determined as appropriate, and is, for example, 1 degree.

The determination part 121 may determine that the steering control operation has been performed if the driver has performed a correct steering control operation, and may determine that the steering control operation has not been performed if the driver has not performed the correct steering control operation. For example, the determination part 121 determines that the correct steering control operation has been performed if a turning direction of the vehicle 2 under the automatic control of the steering and a turning direction by the driver's steering control operation are the same. The determination part 121 determines that the correct steering control operation is not performed if the turning direction under the automatic control and the turning direction by the driver's steering control operation are the different.

As a specific example, when the automatic control of the steering is for a right turn, the determination part 121 determines that the correct steering control operation has been performed if the driver's steering control operation is that of turning to the right, and determines that the correct steering control operation has not been performed if the direction of the driver's steering control operation is for a left turn. By doing this, when the driver performs an erroneous operation that contradicts the autonomous driving control, the determination part 121 can prevent the driver's erroneous operation from being determined as the correct steering control operation.

The determination part 121 determines whether the steering control operation is performed when the vehicle 2 is traveling on a road with a gradient. The determination part 121 determines whether a road on which the vehicle 2 is traveling is a road with a gradient or not on the basis of a detection value of an acceleration sensor mounted on the vehicle 2.

The determination part 121 may determine whether a road has a gradient or not on the basis of map information including gradient information indicating the presence or absence of a gradient of the road. In this case, the determination part 121 acquires map information stored in advance in the storage 11, or acquires map information from an external device via a communication device (not shown). Then, the determination part 121 references the map information and determines that the vehicle 2 is traveling on a road with a gradient when the map information indicates that there is a gradient on the road on which the vehicle 2 is traveling. The determination part 121 references the map information and determines that the vehicle 2 is traveling on a road with no gradient when the map information indicates that there is no gradient on the road on which the vehicle 2 is traveling.

When it is determined that the speed control operation has been performed while the vehicle 2 is avoiding obstacles under the autonomous driving control, the control switching part 122 switches the automatic control of the speed included in the autonomous driving control to the manual speed control and continues the automatic control of the steering. In this way, the control switching part 122 can prevent a delay in the steering by continuing the automatic control of the steering even if the driver takes his/her hands off the steering wheel 5 and cannot manually operate the steering wheel 5, when the driver's speed control operation is performed while the obstacle avoidance is performed under the autonomous driving control. As a result, the vehicle 2 can safely avoid obstacles.

The control switching part 122 switches the automatic control of the steering to the manual steering control when it is determined that the steering control operation is performed while the vehicle 2 avoids obstacles under the autonomous driving control. At this time, the control switching part 122 continues the automatic control of the speed if it has been determined that the speed control operation has not been performed, and switches the automatic control of the speed to the manual speed control if it has been determined that the speed control operation has been performed. By doing this, the control switching part 122 can switch the automatic control to the manual control if there is an operation by the driver, and can continue the automatic control if there is no operation by the driver.

Processing of Switching Control

Figure 4:
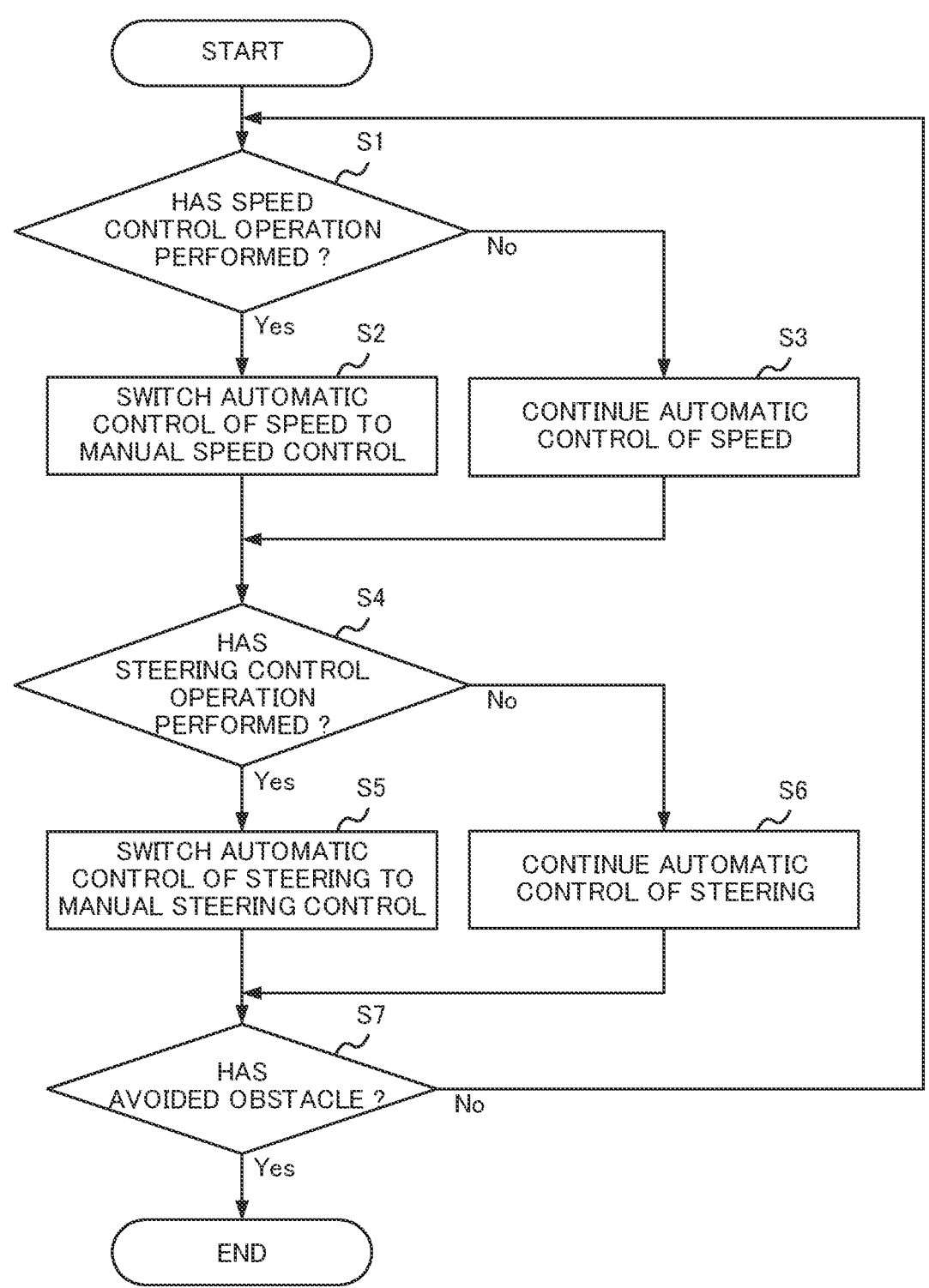
FIG. 4 is a flowchart showing an example of a process of switching control from automatic control to manual control.

FIG. 4 is a flowchart showing an example of a process of switching control from automatic control to manual control. The flowchart of FIG. 4 is executed when the autonomous driving apparatus 6 starts the obstacle avoidance under the autonomous driving control.

The determination part 121 determines whether a speed control operation by the driver has been performed (step S1). Specifically, the determination part 121 determines that the speed control operation has been performed when at least one of a depression amount of the accelerator pedal 3 or a depression amount of the brake pedal 4 of the vehicle 2 is equal to or greater than a determination threshold value corresponding to the target speed under the autonomous driving control. The determination part 121 determines that the speed control operation has not been performed if the depression amount is less than the determination threshold value.

When it is determined that the speed control operation has been performed (Yes in step S1), the control switching part 122 switches the automatic control of the speed included in the autonomous driving control to the manual speed control (step S2). When it is determined that the speed control operation has not been performed (No in step S1), the control switching part 122 continues the automatic control of the speed (step S3). It should be noted that the control switching part 122 continues the automatic control of the steering in any case.

The determination part 121 determines whether a steering control operation by the driver has been performed (step S4). For example, the determination part 121 determines that the steering control operation has been performed if the rotation angle of the steering wheel 5 is outside of a determination range H, in which the reference angle $\theta$ is included. The determination part 121 determines that the steering control operation has not been performed while the rotation angle of the steering wheel 5 is within the determination range H, in which the reference angle $\theta$ is included. When it is determined that the steering control operation has been performed (Yes in step S4), the control switching part 122 switches the automatic control of the steering to the manual steering control (step S5). When it is determined that the steering control operation has not been performed (No in step S4), the control switching part 122 continues the automatic control of the steering (step S6).

The determination part 121 determines whether the vehicle 2 has avoided an obstacle (step S7). If the obstacle has been avoided, (Yes in step S7), the determination part 121 ends the process. If the obstacle has not been avoided (No in step S7), the determination part 121 repeats steps S1 to S7 until the vehicle 2 avoids the obstacle. After the second and subsequent executions of the flowchart of the FIG. 4, the determination part 121 may omit the processes from step S1 to step S3 when it is determined that the speed control operation has been performed, and the determination part 121 may omit the processes from step S4 to step S6 when it is determined that the steering control operation has been performed. When both the processes in step S2 and step S5 are executed, the determination part 121 ends the process of switching the control.

Effect of the Controller 1

As described above, the controller 1 switches between (i) the autonomous driving control for causing the vehicle 2 to travel by automatically controlling the steering and speed of the vehicle 2 and (ii) the manual driving control in which the steering and speed are controlled by the driver's operation. When the speed control operation by the driver has been performed while an obstacle preventing traveling of the vehicle 2 is being avoided under the autonomous driving control, the controller 1 switches the automatic control of the speed included in the autonomous driving control to the manual control and continues the automatic control of the steering.

In this way, the controller 1 can prevent a delay in the steering by continuing the automatic control of the steering even if the driver takes his/her hands off the steering wheel 5 and cannot manually operate the steering wheel 5, when the driver's speed control operation is performed while the obstacle avoidance is performed under the autonomous driving control. As a result, the vehicle 2 can safely avoid obstacles.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. A controller that executes autonomous driving control for causing a vehicle to travel by automatically controlling steering and speed of the vehicle, the controller comprising:

a processor that determines whether a speed control operation for controlling the speed has been performed and whether a steering control operation for controlling a steering angle has been performed by a driver while an obstacle preventing the vehicle from traveling is being avoided under the autonomous driving control and switches the automatic control of the speed included in the autonomous driving control to the manual control, and continues the automatic control of the steering when it is determined that the speed control operation has been performed, wherein the processor sets, before determining that the steering control operation has been performed by the driver, as a reference angle an angle by which a steering wheel of the vehicle is rotated to a position corresponding to a control amount of the steering under the autonomous driving control and determines that the steering control operation has been performed by the driver when a rotation angle of the steering wheel is outside of a determination range, in which the reference angle is included.

2. The controller according to claim 1, wherein the processor determines that the speed control operation has been performed when at least one of a depression amount of an accelerator pedal and a depression amount of a brake pedal of the vehicle is equal to or greater than a determination threshold value which is determined according to a target speed under the autonomous driving control.

3. The controller according to claim 2, wherein the processor determines that the speed control operation has not been performed when the depression amount of the accelerator pedal is less than the determination threshold value and the depression amount of the brake pedal is less than the determination threshold value.

4. The controller according to claim 2, wherein the greater the target speed, the more the processor increases the determination threshold value.

5. The controller according to claim 1, wherein the processor determines that the steering control operation has been performed by the driver when contact with an object is detected by a sensor attached to the steering wheel of the vehicle, and the processor switches the automatic control of the steering to manual control when it is determined that the steering control operation has been performed.

6. The controller according to claim 1, wherein the processor determines whether the steering control operation has been performed when the vehicle is traveling on a road with a gradient.

7. The controller according to claim 1, wherein the processor determines that the steering control operation has been performed when a turning direction of the vehicle under the automatic control of the steering and a turning direction of the steering control operation are the same, and determines that the steering control operation has not been performed when the turning direction of the automatic control of the steering and the turning direction of the steering control operation are different.

* * * * *